(12) United States Patent
Schabel, Jr. et al.

(10) Patent No.: US 11,958,777 B2
(45) Date of Patent: *Apr. 16, 2024

(54) LOW DENSITY PARTICLES FOR USE IN CONCRETE AND OTHER MIXTURES

(71) Applicant: Schabel Polymer Technology, LLC, Westlake, OH (US)

(72) Inventors: Norman G. Schabel, Jr., Rocky River, OH (US); David Schabel, Avon, OH (US); Doug Gorski, North Ridgeville, OH (US)

(73) Assignee: SLIPCO, LLC, Westlake, OH (US)

( * ) Notice: Subject to any disclaimer, the term of this patent is extended or adjusted under 35 U.S.C. 154(b) by 284 days.

This patent is subject to a terminal disclaimer.

(21) Appl. No.: 16/923,459

(22) Filed: Jul. 8, 2020

(65) Prior Publication Data

US 2021/0009472 A1 Jan. 14, 2021

Related U.S. Application Data

(60) Provisional application No. 62/871,447, filed on Jul. 8, 2019, provisional application No. 62/871,460, filed on Jul. 8, 2019.

(51) Int. Cl.
| | | |
|---|---|---|
| *C04B 28/04* | (2006.01) |
| *C04B 14/06* | (2006.01) |
| *C04B 14/38* | (2006.01) |
| *C04B 14/42* | (2006.01) |
| *C04B 16/06* | (2006.01) |
| *C04B 16/12* | (2006.01) |

(Continued)

(52) U.S. Cl.
CPC ............ *C04B 28/04* (2013.01); *C04B 14/064* (2013.01); *C04B 14/386* (2013.01); *C04B 14/42* (2013.01); *C04B 16/0625* (2013.01); *C04B 16/065* (2013.01); *C04B 16/0666* (2013.01); *C04B 16/0691* (2013.01); *C04B 16/12* (2013.01); *C04B 26/06* (2013.01); *C04B 26/14* (2013.01); *C04B 26/16* (2013.01); *C04B 28/065* (2013.01); *C04B 28/14* (2013.01); *C04B 20/0028* (2013.01); *C04B 20/0036* (2013.01); *C04B 2201/20* (2013.01)

(58) Field of Classification Search
CPC ..... C04B 28/04; C04B 14/064; C04B 14/386; C04B 14/42; C04B 16/0625; C04B 16/065; C04B 16/0666; C04B 16/0691; C04B 16/12; C04B 26/06; C04B 26/14; C04B 26/16; C04B 28/065; C04B 28/14; C04B 20/0028; C04B 20/0036; C04B 2201/20

See application file for complete search history.

(56) References Cited

U.S. PATENT DOCUMENTS

| | | |
|---|---|---|
| 7,632,248 B2 | 12/2009 | Delk et al. |
| 7,632,348 B2 | 12/2009 | Cowan et al. |

(Continued)

*Primary Examiner* — Crystal J. Lee
(74) *Attorney, Agent, or Firm* — Wentsler LLC

(57) ABSTRACT

A lightweight composite composition includes a plurality of lightweight particles including a volume of at least about 10% of a total volume of the lightweight composite composition. The plurality of lightweight particles includes an average bulk density within a range from about 0.001 g/cc to about 1.5 g/cc and an average particle size within a range from about 0.01 microns to about 90 mm. Methods of manufacturing a lightweight composite composition are provided.

16 Claims, 5 Drawing Sheets

(51) Int. Cl.
    *C04B 20/00*     (2006.01)
    *C04B 26/06*     (2006.01)
    *C04B 26/14*     (2006.01)
    *C04B 26/16*     (2006.01)
    *C04B 28/06*     (2006.01)
    *C04B 28/14*     (2006.01)

(56) References Cited

U.S. PATENT DOCUMENTS

| | | | |
|---|---|---|---|
| 7,644,548 B2 | 1/2010 | Guevara et al. | |
| 7,648,574 B2 | 1/2010 | Guevara et al. | |
| 7,658,797 B2 | 2/2010 | Guevara et al. | |
| 7,666,258 B2 | 2/2010 | Guevara et al. | |
| 7,744,692 B2 | 6/2010 | Guevara et al. | |
| 7,770,691 B2 | 8/2010 | Schabel, Jr. | |
| 7,790,302 B2 | 9/2010 | Ladely (Guevara) et al. | |
| 7,820,094 B2 | 10/2010 | Ladely (Guevara) et al. | |
| 7,964,272 B2 | 6/2011 | Guevara et al. | |
| 8,029,671 B2 | 10/2011 | Cath et al. | |
| 8,048,219 B2 | 11/2011 | Woolfsmith et al. | |
| 8,167,998 B2 | 5/2012 | Ladely (Guevara) et al. | |
| 8,357,240 B2 | 1/2013 | Sweat et al. | |
| 8,969,464 B2 | 3/2015 | LeBlanc | |
| 10,087,105 B2 | 10/2018 | Calvin et al. | |
| 2001/0047741 A1* | 12/2001 | Gleeson | C04B 28/04 106/677 |
| 2012/0187323 A1* | 7/2012 | Jorgensen | C04B 26/12 425/200 |
| 2014/0060826 A1* | 3/2014 | Nguyen | E21B 43/267 166/280.1 |
| 2019/0040728 A1* | 2/2019 | Nguyen | C09K 8/887 |

\* cited by examiner

LOW DENSITY PARTICLES FOR USE IN CONCRETE AND OTHER MIXTURES

CROSS-REFERENCE TO RELATED APPLICATIONS

The following application claims the benefit of priority to U.S. Provisional Application No. 62/871,460, titled "LOW DENSITY PARTICLES FOR USE IN CONCRETE AND OTHER MIXTURES" and filed on Jul. 8, 2019 and U.S. Provisional Application No. 62/871,447, titled "LIGHT-WEIGHT PARTICLE FILLER MATERIAL" and filed on Jul. 8, 2019. The applications are herein incorporated by reference.

FIELD

The field relates generally to lightweight concrete mixtures and other composite mixtures, such as Portland cement, calcium aluminate, calcium sulfoaluminate, gypsum, pozzolans, epoxies, urethanes, acrylics and other polymeric systems, to reduce overall system weight and/or cost and/or impart other performance advantages to the system.

BACKGROUND

Lightweight particles may be used in concrete and other composite applications to reduce weight and density of the final mixture. As described herein, improved lightweight particle(s) and improved lightweight concrete mixtures and other lightweight composite mixtures are disclosed.

SUMMARY

The following presents a simplified summary of the disclosure to provide a basic understanding of some embodiments described in the detailed description.

In some embodiments, a lightweight composite composition comprises a plurality of lightweight particles comprising a volume of at least about 10% of a total volume of the composite composition. The plurality of lightweight particles comprise an average bulk density within a range from about 0.001 g/cc to about 1.5 g/cc and an average particle size within a range from about 0.01 microns to about 90 mm.

In some embodiments, the lightweight composite composition comprises a binder material in contact with the plurality of lightweight particles such that the plurality of lightweight particles are dispersed within the binder material. The binder material comprises a volume within a range from about 5% to about 40% of the total volume of the lightweight composite composition.

In some embodiments, the binder material comprises one or more of a cement, pozzolan, reclaimed infrastructure materials such as recycled concrete, dredging material including but not limited to sand, gravel, clay and the like, gypsum, Portland cement, calcium aluminate, calcium sulfoaluminate, epoxies, urethanes, or acrylics.

In some embodiments, the plurality of lightweight particles comprise one or more of polymer pellets, polymer foam beads, crushed glass, foamed glass spheres, hollow glass microspheres, polymer microspheres, polymer capsules, polymer micro-balloons, or carbon-based pellets.

In some embodiments, the plurality of lightweight particles comprise one or more of acrylic, acrylonitrile based copolymer, agricultural biomass base material(s), a carbon material, graphene; a ceramic material, a silica aerogel material; an alumina material, copolymer and alloy systems, microspheres, rubber, an EPDM material, polyamide, polyolefin, polystyrene, polyvinyl chloride, PET, PMMA, PMU, melamine, urea formaldehyde, nylon, ABS, LDPE, HDPE, PVC, or PVDC, hemp, sisal, rice hulls, oat hulls, ground corncobs, walnut shells, or a wood material.

In some embodiments, the lightweight composite composition further comprises one or more additives or admixtures.

In some embodiments, the additives or the admixtures comprise a volume that is within a range from about 0% to about 30% of a total volume of the lightweight composite composition.

In some embodiments, the plurality of lightweight particles may be treated or modified with one or more of a liquid, a gel, or a powder.

In some embodiments, an R-value of the lightweight composite composition is within a range from about 0 to about 5 per inch.

In some embodiments, a density of the lightweight composite composition is within a range from about 15 pounds per cubic foot to about 135 pounds per cubic foot.

In some embodiments, the plurality of lightweight particles comprise one or more of the following shapes: a rounded shape, a round shape, a sub-round shape, an angular shape, a sub-angular shape, a cylindrical shape, a pancake shape, an oblong shape, a trilobal shape, a tubular shape, a polygonal shape, a disc shape, a shard shape, a platelet shape, a lamellar shape, a regular crystalline shape, or an irregular crystalline shape.

In some embodiments, a lightweight composite composition comprises a plurality of lightweight particles comprising a volume of at least about 10% of a total volume of the lightweight composite composition. The plurality of lightweight particles comprise an average bulk density within a range from about 0.001 g/cc to about 1.5 g/cc and an average particle size within a range from about 0.01 microns to about 90 mm. The lightweight composite composition comprises an aggregate that is one or more of a coarse aggregate or a fine aggregate. The aggregate comprises a volume from between 0% to about 60% of the total volume of the lightweight composite composition. The lightweight composite composition comprises one or more of an additive or an admixture comprising a volume from between 0% to about 20% of the total volume of the lightweight composite composition. The lightweight composite composition comprises a binder material in contact with the plurality of lightweight particles, the aggregate, and the one or more of the additive or the admixture such that the plurality of lightweight particles, the aggregate, and the one or more of the additive or the admixture are dispersed within the binder material. The binder material comprises a volume within a range from about 5% to about 40% of the total volume of the lightweight composite composition.

In some embodiments, the plurality of lightweight particles may be one or more of coated, treated, or modified with one or more of a liquid, a gel, or a powder.

In some embodiments, the aggregate comprises one or more of recycled concrete, dredging material, reclaimed material, sand, gravel, clay or crushed stone.

In some embodiments, methods of manufacturing a lightweight composite composition comprise providing a plurality of lightweight particles comprising a volume of at least about 10% of a total volume of the lightweight composite composition. The plurality of lightweight particles comprise an average bulk density within a range from about 0.001 g/cc to about 1.5 g/cc and an average particle size within a range from about 0.01 microns to about 90 mm. Methods comprise dispersing the plurality of lightweight particles within a binder material to form a mixture such that the plurality of lightweight particles are suspended within the binder material. The binder material comprises a volume within a range from about 5% to about 20% of the total volume of the lightweight composite composition. Methods comprise setting the mixture for a period of time to form the lightweight composite composition comprising a compressive strength of at least 10 pounds/in$^2$.

In some embodiments, methods comprise applying one or more of a coating, treatment, or modification to the plurality of lightweight particles prior to dispersing the plurality of lightweight particles within the binder material(s).

In some embodiments, the binder material comprises one or more of a cement, pozzolan, gypsum, Portland cement, calcium aluminate, calcium sulfoaluminate, epoxies, urethanes, or acrylics.

In some embodiments, methods comprise dispersing one or more of an additive or an admixture within the binder material such that the one or more of the additive or the admixture comprise a volume from between 0% to about 20% of the total volume of the lightweight composite composition.

In some embodiments, methods comprise, after setting the mixture for the period of time, forming one or more of a concrete block, cast shape or structure from the mixture.

In some embodiments, methods comprise, after setting the mixture for the period of time, using the lightweight composite composition in one or more of the following applications: cementing, concrete, including ready-mix, precast, tilt-up panels, ornamental, decorative, countertops, multifamily residences, commercial buildings, multi-story buildings, DIY, home improvement, roof tiles, underlayment, block, brick, mining, shotcrete, gunnite, refractory/monolithics, foundry, 3D printing, forgings and castings, cultured marble alternatives, roofing, flowable fill, void fill, underground applications, decorative, stucco, plaster, urethane and/or epoxy concrete, composites, or adhesives.

BRIEF DESCRIPTION OF THE DRAWINGS

These and other features, embodiments and advantages are better understood when the following detailed description is read with reference to the accompanying drawings, in which.

DETAILED DESCRIPTION

Reference will now be made to exemplary embodiments, examples of which are illustrated in the accompanying drawings. It is to be understood that other embodiments may be utilized and structural and functional changes may be made without departing from the respective scope of the application. Moreover, features of the various embodiments may be combined or altered without departing from the scope of the application. As such, the following description is presented by way of illustration only and should not limit in any way the various alternatives and modifications that may be made to the illustrated embodiments and still be within the spirit and scope of the application.

Figure 1:
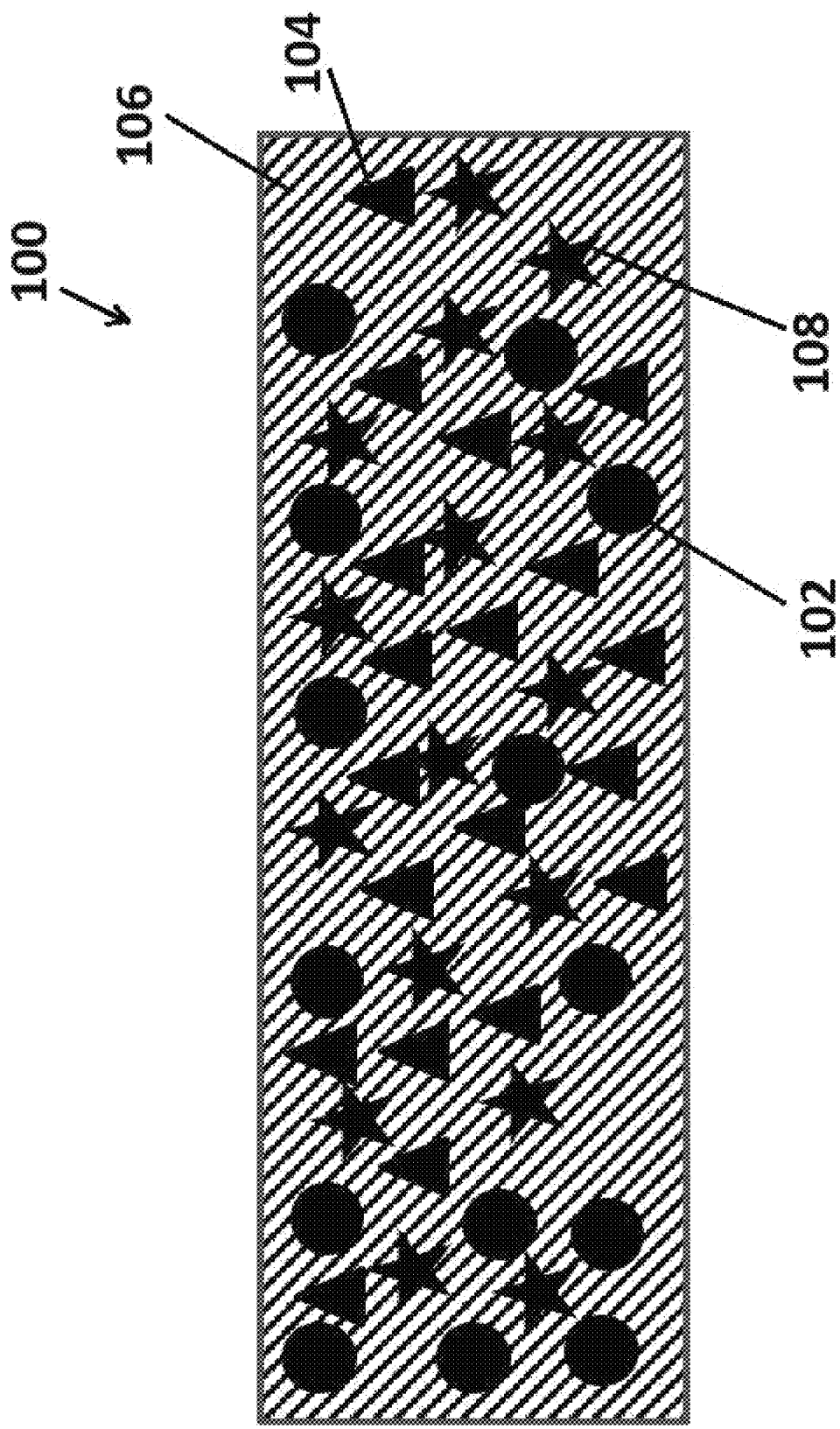
FIG. 1 illustrates an example lightweight composite composition comprising one or more low density particles.

Referring to FIG. 1, an example of a lightweight composite composition 100 is illustrated. In some embodiments, the lightweight composite composition 100 can comprise one or more materials. For example, as described herein, the lightweight composite composition 100 can comprise a plurality of lightweight particles 102. As used herein, the term "plurality" can comprise one or more different types (e.g., size, shape, material, coating application, etc.) of particles. For example, in some embodiments, the plurality of lightweight particles can comprise one type of particle, wherein the one type of particle has a substantially uniform size, shape, material, coating application. However, in some embodiments, the plurality of lightweight particles can comprise multiple types of particles, wherein the particles can comprise different sizes, shapes, materials, and/or coating applications, etc. In some embodiments, the plurality of lightweight particles 102 can comprise one or more of the following shapes: a rounded shape, a round shape, a sub-round shape, an angular shape, a sub-angular shape, a cylindrical shape, a pancake shape, an oblong shape, a trilobal shape, a tubular shape, a polygonal shape, a disc shape, a shard shape, a platelet shape, a lamellar shape, a regular crystalline shape, or an irregular crystalline shape.

Figure 5:
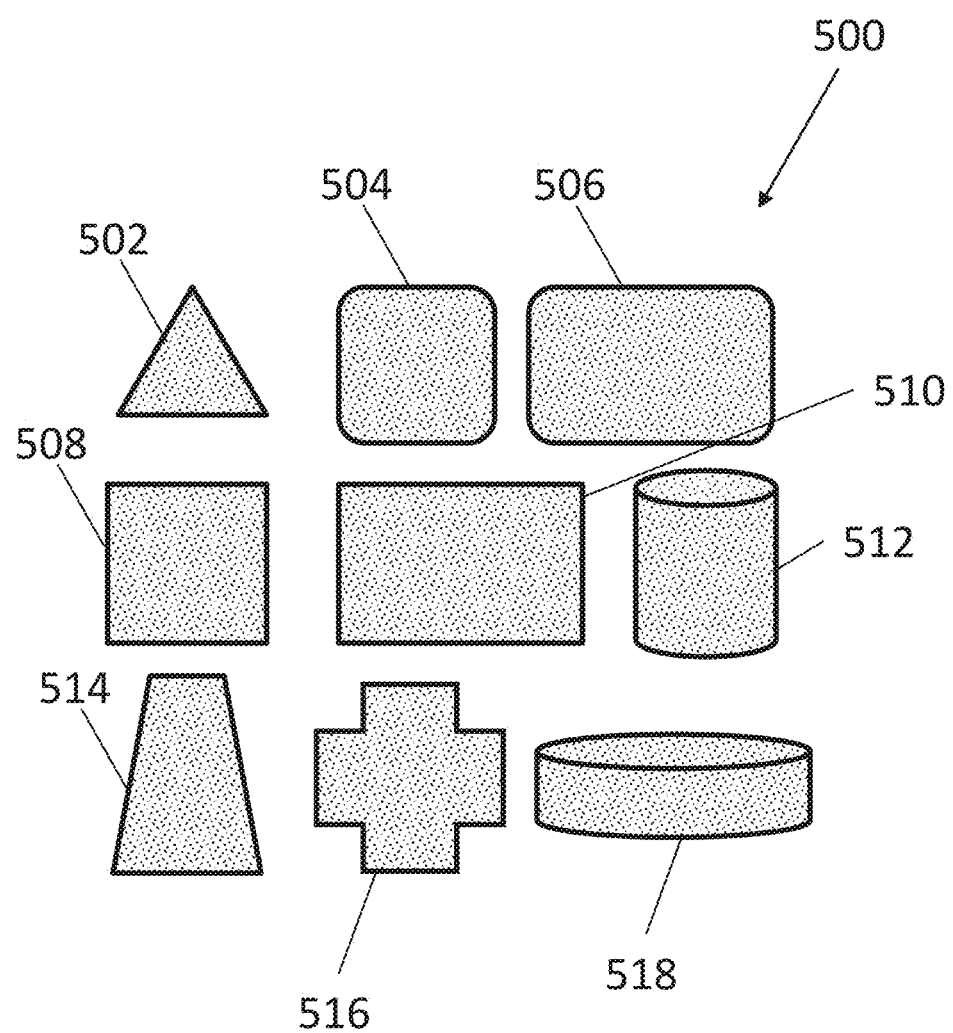
FIG. 5 illustrates an example lightweight composite composition comprising one or more low density particles.

FIG. 5 illustrates several possible shapes of a plurality of lightweight particles 500. The following lightweight particles can be used separately or in addition to any of the other lightweight particles 102 disclosed here in any of the applications disclosed herein. For example, the plurality of lightweight particles 500 can comprise a triangularly shaped lightweight particle 502. In some embodiments, the plurality of lightweight particles 500 can comprise square shaped lightweight particle 504 with rounded corners. In some embodiments, the plurality of lightweight particles 500 can comprise a rectangularly shaped lightweight particle 506 with rounded corners. The plurality of lightweight particles 500 can comprise a square shaped lightweight particle 508 with non-rounded corners. The plurality of lightweight particles 500 can comprise a rectangularly shaped lightweight particle 510 with non-rounded corners. The plurality of lightweight particles 500 can comprise a cylindrically shaped lightweight particle 512. The plurality of lightweight particles 500 can comprise a trapezoidal shape 514. In some embodiments, the plurality of lightweight particles 500 can comprise a plus-signed shape 516. In some embodiments, the plurality of lightweight particles 500 can comprise a cylindrically shaped lightweight particle 518 with a differing length than the particle 512.

In some embodiments, the lightweight composite composition 100 can comprise one or more aggregates 104, for example, one or more of coarse aggregates or fine aggregates. In addition, in some embodiments, the lightweight composite composition 100 can comprise a binder 106 within which the plurality of lightweight particles 102 and the one or more aggregates 104 may be suspended. In some embodiments, the lightweight composite composition 100 can comprise an admixture 108 that may be suspended within the binder 106. Together, the combination of the plurality of lightweight particles 102, the one or more aggregates 104, the binder 106, and the admixture 108 can yield several benefits including, for example, decreasing the weight of the lightweight composite composition 100.

Decreasing the weight of formulated systems has several benefits. These benefits may comprise, for example, worker safety. If workers have to lift and move materials that weigh less, there is less wear and tear on their bodies and less risk of them being injured on the job. Additional benefits may comprise reduced shipping costs, since the lightweight composite composition 100 weighs less, more material may be able to fit on a truckload and effectively decrease overall freight costs per unit shipped. Another benefit involves LEED credits, for example, by using the plurality of lightweight particles 102, the weight of the lightweight composite composition 100 is reduced which enables more material to be shipped on a truck and maximize shipment quantity and efficiencies. Being able to ship more material on a truck reduces the overall carbon footprint of a given product. Another benefit involves the processing/application, since, if the system (e.g., the lightweight composite composition 100) weighs less, there is less energy required to mix the batch (e.g., less weight to move requires less energy to move it) and if the lightweight composite composition 100 is applied in the field, less heavy equipment may be needed which can reduce costs. Additionally, regarding production time, if the plurality of lightweight particles 102 is largely non-porous and does not need to be pre-treated before being used in the lightweight composite composition 100, then the lightweight composite composition 100 can be made faster and with less additional monitoring or preparation equipment than if an alternative, more porous particles(s) were used. Likewise, due to the weight savings, a larger bag weighing the same or less than traditional bags can be used, resulting in less bags required to achieve the same amount of product, thereby saving labor steps and expediting time to complete the job.

Another benefit of the weight reduction of the lightweight composite composition 100 is that, since the plurality of lightweight particles 102 may be less porous, less water or resin demand for handling and formulating may be needed, which can help to decrease weight and improve system performance. A further benefit of the lightweight composite composition 100 is that if the plurality of lightweight particles 102 or a percentage of the aggregate 104 used encapsulates air or another gas within it, then an R-Value is inherent in the lightweight composite composition 100. For instance, nominal imparted R-Value from using lightweight particle(s) can be within a range from about 0.0 to about 1.0, or from about 1.0 to about 2.0, or from about 2.0 to about 3.0 per inch, or from about 3.0 to about 4.0 per inch, or from about 4.0 to about 5.0 per inch. In some embodiments, an R-value of the lightweight composite composition 100 may be within a range from about 0 to about 5 per inch. Another benefit of the lightweight composite composition 100 is that if the plurality of lightweight particles 102 or a percentage of the plurality of lightweight particles 102 has great inherent fire resistance characteristics, then the lightweight composite composition 100 may comprise increased fire resistance characteristics due to the low-density plurality of lightweight particles 102. Another benefit involves improved rigidity, since the size, form, composition, shape, porosity and inherent compressive strength of the plurality of lightweight particles 102 may result in increased compressive strength of the lightweight composite composition 100. Similarly, using certain plurality of lightweight particles 102, tensile strength and/or flexibility may be imparted or engineered into the lightweight composite composition 100. The benefits of this include the ability to drop a workplace item, such as a hammer, on the lightweight composite composition 100 and not have a major surface failure.

Figure 2:
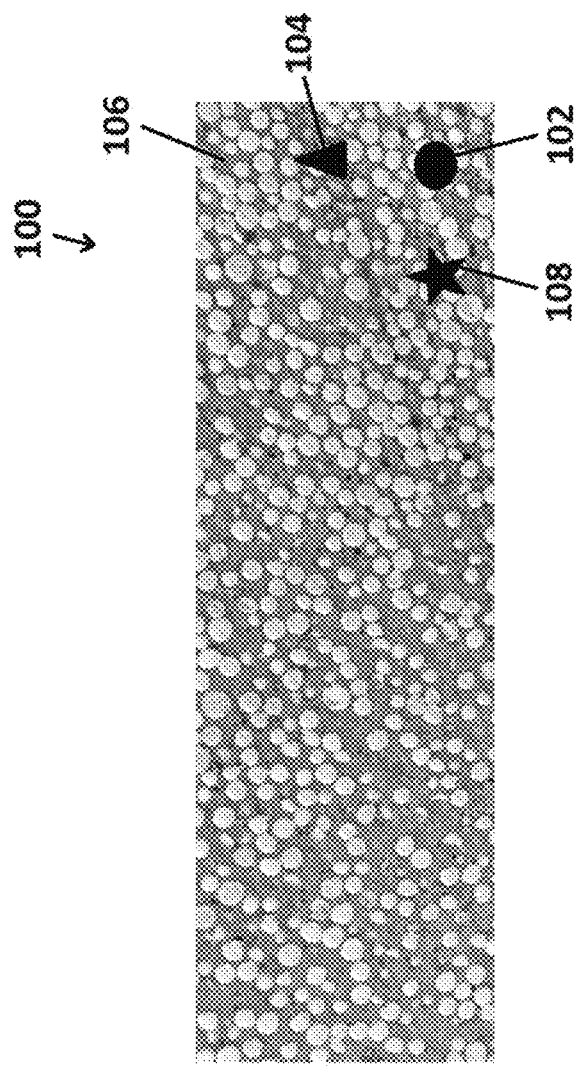
FIG. 2 illustrates an example lightweight composite composition comprising one or more low density particles.
Figure 3:
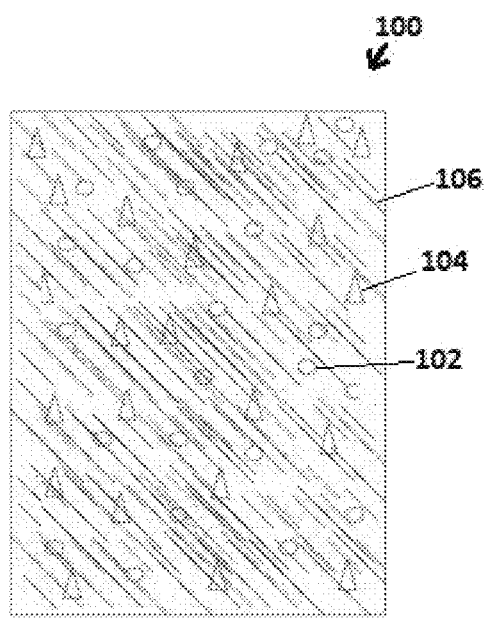
FIG. 3 illustrates an example lightweight composite composition comprising one or more low density particles.
Figure 4:
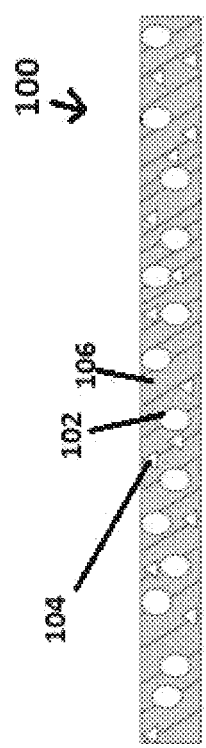
FIG. 4 illustrates an example lightweight composite composition comprising one or more low density particles.

Another benefit comprises improved cracking and/or freeze thaw performance. For example, the use of certain lightweight particles 102 can result in reduced cracking of the lightweight composite composition 100, as well as improved freeze—thaw performance. For instance, freeze-thaw of a cementitious mixture may be measured according to ASTM C666, with no loss measured at over 300 cycles. The lightweight composite composition 100 can comprise improved homogeneity due to the size, form, composition, shape, and porosity of the lightweight particles 102 used, and in conjunction with one or a plurality of additive/admixture 104, 108, may result in increased homogeneity and performance of the lightweight composite composition 100. Another benefit includes engineered finished densities, since the ability to design a desired finished density of the lightweight composite composition 100 based on using one or more lightweight particles 102 and additive/admixture(s) 104, 108 is novel. In addition, improved particle packing may be achieved since, by using one or more low density lightweight particles 102 of varying sizes, shapes, porosities, compositions and densities to decrease the overall density of the lightweight composite composition 100, the interstitial spaces between the lightweight particles 102 can be minimized and thus the outcome is greater rigidity and/or strength and/or improved surface and/or weatherability. Further, using low density lightweight particles 102 with advantageous volume cost and performance characteristics can serve to act as a binder (e.g., cementitious, pozzolanic, resinous, etc.) extender and decrease system cost. Also, low density lightweight particles 102 may substantially reduce volume cost of the lightweight composite composition 100 as a result of a substantially lower bulk density and volume cost when compared with other conventional materials. FIG. 2 illustrates an image of the lightweight composite composition 100 comprising the lightweight particles 102, the aggregates 104, the binder 106, and the admixtures 108. FIG. 3 illustrates an example of the lightweight composite composition 100 comprising the lightweight particles 102, the aggregates 104, and the binder 106, but not the admixtures 108. FIG. 4 illustrates a side view of FIG. 3, in which the lightweight composite composition 100 comprises the lightweight particles 102, the aggregates 104, and the binder 106, but not the admixtures 108.

The use of low-density lightweight particles 102 to decrease the weight of the lightweight composite composition 100 is attractive for the following industries, markets and applications, including variations and others not listed. These industries comprise one or more of cementing, concrete, including ready-mix, precast, tilt-up panels, ornamental, decorative, countertops, multi-family residences, commercial buildings, multi-story buildings, DIY, home improvement, roof tiles, underlayment, block, brick, mining, shotcrete, gunnite, refractory/monolithics, foundry, 3D printing, forgings and castings, cultured marble alternatives, roofing, flowable fill, void fill, underground applications, decorative, stucco, plaster, urethane and/or epoxy concrete, composites, adhesives and other similar applications obvious to one skilled in the art. In some embodiments, the density, size, shape, porosity, surface coating/treatment, rigidity, flexibility, temperature characteristics, chemical resistance, static and/or magnetic charge, particle packing, insulative value, particle distribution and composition of the lightweight particles 102 facilitates the weight reduction and performance of the lightweight composite composition 100. In this way, the lightweight composite composition 100 can form a low-density material that can be used to make concrete masonry units (CMU) or concrete blocks, sound barrier walls, tilt-up or pre-cast walls or forms, poured floors or roofs, roof tiles, ready-mix concrete, decorative concrete, flooring underlayment, flowable fill, shotcrete, refractory, parking decks and garages, infrastructure, construction, bridge decks, roads, maritime docks, cementing, and the like. These lightweight particles 102 may either be pre-blended into the lightweight composite composition 100 and packaged, and/or added in during mixing or application of the lightweight composite composition 100, and/or placed in a given space and the binder 106 or composite system poured in, among, over or around the lightweight particles 102. The ability to have these lightweight particles 102 preblended into the dry or liquid mix and achieve desired performance is unique and novel, as is a series of formulas herein disclosed. In some embodiments, a density of the lightweight composite composition 100 can be within a range from about 15 pounds per cubic foot to about 135 pounds per cubic foot.

In some embodiments, the lightweight composite composition 100 comprises the use of one or more lightweight particles 102 with an average bulk density within a range from about 0.002 g/cc (grams per cubic centimeter) to about 0.019 g/cc and an average particle diameter from within a range from about 0.02 mm (millimeters) to 6.0 about mm. In some embodiments, the lightweight composite composition 100 comprises the use of one or more lightweight particles 102 with an average bulk density within a range from about 0.160 g/cc to about 1.5 g/cc and an average particle diameter within a range from about 0.001 mm to about 8 mm.

In some embodiments, the lightweight composite composition 100 comprises the use of one or more lightweight particles 102 with an average bulk density within a range from about 0.005 g/cc to about 0.40 g/cc and an average particle size within a range from about 0.001 microns to about 1,200 microns.

In some embodiments, the lightweight composite composition 100 comprises the use of one or more lightweight particles 102 with an average bulk density within a range from about 0.01 g/cc to about 1.200 g/cc and an average particle size within a range from about 0.01 mm to about 8.0 mm.

In some embodiments, the lightweight composite composition 100 comprises the use of one or more lightweight particles 102 with an average bulk density within a range from about 0.160 g/cc to about 4.0 g/cc and an average particle diameter within a range from about 0.001 mm to about 6 mm.

In some embodiments, the lightweight composite composition 100 comprises the use of one or more lightweight particles 102 with an average bulk density within a range from about 0.001 g/cc to about 1.5 g/cc and an average particle size (e.g., diameter) within a range from about 0.01 microns to about 90 mm. In some embodiments, the average particle size (e.g., diameter) can be within a range from about 0.05 microns to about 90 mm.

In some embodiments, the lightweight particles 102 above may be used as a volume filler in conjunction with other filler materials or additives. In some embodiments, the plurality of lightweight particles 102 can comprise a volume of at least about 10% of a total volume of the lightweight composite composition 100.

In some embodiments, the lightweight particles 102 may be coated by either a liquid and/or a gel and/or a powder, and/or treated or modified in another manner, in order to either improve rheology of the system, modify the static and/or magnetic charge of the particle, affect how the lightweight particles 102 couple or bond with other materials in the system, encapsulate something within the particle, prevent the release of something within the particle or to regulate the release of something from the particle in a controlled manner, to increase the particle's rigidity, to increase the particle's fire and/or chemical resistance, improve flow, improve particle packing, to modify the particle's porosity or water, liquid or resin demand in the system, and/or to render the particle inert or inactive. The lightweight particles 102 may also be modified before production, during production or after production to achieve the desired modifications for system optimization. Certain particles may be more accepting of various modification treatments and methods than others, and more than one modification, coating or other effect may be applied to a given particle to achieve the desired effect for optimum system performance. For example, some lightweight particles 102 have a greater propensity for static charge than others, and that static charge can be mitigated through pre-production modifications to the base particle, production techniques, and post production with coatings, treatments and other modification techniques. In this way, the plurality of lightweight particles 102 can be treated or modified with one or more of a liquid, a gel, or a powder.

In some embodiments, chemical, mechanical and/or physical modifications can be used to offset undesirable performance characteristics in lightweight particles 102 and additives. Here it is presumed that multi-functional resins and additives can offset the inherent flotation, rheology, electrostatic charge, temperature performance, bonding and strength characteristics that otherwise create significant limitations in usage. Such coatings, treatments and modifications can also be advantageously utilized to render base particles inert or create a delayed or subsequent reaction as designed to fit specific functionality.

In order to achieve engineered low densities, lightweight particles 102 of low densities can be added to the mix to occupy volume while adding minimal weight compared with the materials it is otherwise replacing or being added to. These low density lightweight particles 102 can naturally tend to float or segregate to the top of the dry or liquid mix before a hardening reaction occurs, which may negatively impacts the homogeneity and uniformity of the mix, as well as hinders its workability, finish, strength and other required and ancillary performance requirements of the mix. In order to counteract this undesirable natural phenomenon, it may be beneficial to surface treat/modify/coat the lightweight particles 102, often with a bonding/adhesion/coupling agent, or mechanically, to help keep the lightweight particles 102 in suspension after mixing the formulated system, and/or to add a rheology/viscosity/thixotropic and other modifying additive(s) as an ingredient in the mix. Rheology modifiers may either be naturally or synthetically derived. One such category that may be used are alkali swellable emulsions (ASE), hydrophobically modified alkali swellable emulsions (HASE) and/or hydrophobically modified, ethoxylated urethane resins (HEUR). Another example of a rheology modifier that may be used is as cellulosic thickeners such as Ethyl Hydroxyethyl Cellulose (EHEC) and Methyl Ethyl Hydroxyethyl Cellulose (MEHEC) and/or hydrophilic or hydrophobic fumed silica.

Controlling float out or segregation of lightweight particles is merely the opposite function of controlling the tendency of high-density particles to sink or settle to the bottom of a mix. Therefore, the combination of materials in prepackaged systems that are engineered to control these factors can readily be modified for the control of high density and not merely lightweight materials to provide a similar desired effect, which is a uniform and homogeneous mixture during production and application.

In some embodiments, lightweight materials can be characterized as having specific gravity of less than about 1.0 g/cc, for example, within a range from about 0.005 to about 0.9. Correspondingly, heavy weight materials can comprise products that have a nominal specific gravity of greater than about 1.0 g/cc, for example, within a range from about 2.4 to about 5.0+g/cc. Examples can include mineral fillers and extenders, as well as pigments and sound absorbing agents.

These above mentioned lightweight particles 102 may be in the form of one or more of polymer pellets, polymer foam beads, crushed glass, foamed glass spheres, hollow glass microspheres or polymer microspheres, polymer capsules, polymer micro-balloons and or carbon-based pellets or spheres, or particles that may be comprised of one or more of the following materials: acrylic, acrylonitrile based copolymer, agricultural biomass base material(s), carbon material (e.g., carbon spheres, carbon foam, carbon particles, etc.), graphene, a ceramic material, ceramic beads, ceramic microspheres, ceramic foam particles, a silica aerogel material, alumina, bubble alumina, fused alumina, copolymer and alloy systems, such as ABS, polymeric microspheres, glass microspheres, foamed glass spheres or foamed glass microspheres, foamed rubber, crumb rubber, processed EPDM granules, microballoons, polyamide, polyolefin, polystyrene, polyvinyl chloride and copolymer variations thereof such as polyvinylidene dichloride, PET, PMMA, melamine, urea formaldehyde, nylon, ABS, LDPE, HDPE, PVC or PVDC, organic materials such as hemp, sisal, rice or oat hulls, walnut shells, wood pulp or shavings, etc. Any or all of these materials may be used, and may have a coating depending on the characteristics and performance required. A coating may be applied before processing the material, during the processing of the material and after the material has been produced. The coating may be mechanically, chemically or otherwise imparted into or onto or as part of the particle. An example of a liquid, a gel, or a powder coating may comprise calcium carbonate or calcium stearate.

The use of one or more of the following additives and/or admixtures 104, 108 is beneficial to the ability to use the low-density lightweight particles 102 to successfully achieve both weight reduction and desired performance in the lightweight composite composition 100. These additives and/or admixtures 104, 108 help to enhance the benefits of the lightweight particles 102 and/or overcome their innate physical limitations when used in a formulated system. As an example, the use of a rheology modifier helps to overcome the natural phenomenon of the lightweight particles 102 to segregate or float to the top of the binder 106 and thereby weaken it or transfer an undesirable performance characteristic to the system. In some embodiments, the additives or the admixtures 104, 108 can comprise a volume that is within a range from about 0% to about 30% of a total volume of the lightweight composite composition 100.

In some embodiments, the lightweight composite composition 100 comprises the use of one or more of the following particles and/or additives and/or admixtures 104, 108: acrylic fiber, carbon fiber, graphene, stainless steel fiber, basaltic fiber, glass fiber or other related fibrous materials, soda lime glass, calcium carbonate, magnesium carbonate, silicates, titanium dioxide, clay and talc, alumina, calcium stearate, magnesium stearate, zinc stearate, coloring agents, corrosion inhibitors, shrinkage reducers, cork, fly ash, foaming agents and or defoamers, air entrainers, fire retardants, hrwr, mrwr, plasticizer, polycarboxylate and variations thereof, fiber or shavings, metakaolin, polymer resin additive, vinyl acetate and ethylene based redispersible powders, set retarding and or accelerating admixtures, strength enhancing admixtures, silanes, siloxane, silicones, surfactants, coupling agents and other resin system variations and combinations thereof, silica fume, micro-silica, slag, sodium olefin sulfonate and/or sodium hydroxide or butoxyethanol and/or glutaraldehyde, calcium hydroxide, calcium sulfate, wollastonite, thixotropes and or rheology modifiers which may include cellulosics, fumed silicas, functional chemical and polymer resin systems and other related materials, zinc borate or boric acid, chlorinated paraffin, antimony oxide, alumina trihydrate, magnesium hydroxide and related chemicals.

The binder 106 can comprise various material, for example, cementitious, pozzolanic, gypsum, Portland cement, calcium aluminate, and other systems as described. In addition, the lightweight particle(s) and/or additives and/or admixtures 102, 104, 106, 108 can be used in emulsion coatings, latex resin systems, acrylic PVA, EVA, Nonaqueous Resins such as Epoxy, Urethane, Polyurea, Polyester, Silicon or Silicon Modified Resins to similar effect. In some embodiments, the binder 106 can be in contact with the plurality of lightweight particles 102 such that the plurality of lightweight particles 102 are dispersed within the binder material 106. In some embodiments, the binder 106 can comprise a volume within a range from about 5% to about 40% of the total volume of the lightweight composite composition 100. In some embodiments, the binder 106 can comprise one or more of (e.g., one of or a mixture of multiple of) a cement, pozzolan, gypsum, Portland cement, calcium aluminate, calcium sulfoaluminate, epoxies, urethanes, or acrylics.

The packaging of the lightweight particles 102, with or without the additive(s) and/or admixture(s) 104, 108 is beneficial to the ability to create an easy to use particle and or formulated system. These lightweight particles 102 may either be packaged with or without any of the aforementioned admixtures, binders and/or aggregates 104, 106, 108 to be added to the system at the point of use, or prepackaged as a partial or complete blend ready to be mixed and or used. In some embodiments, the aggregate 108 can comprise one or more of a coarse aggregate or a fine aggregate, and the aggregate 108 can comprise a volume from about 0% to about 60% of the total volume of the lightweight composite composition 100. A coarse aggregate can comprise for example, a gravel while a fine aggregate can comprise, for example, sand. In some embodiments, the aggregate 108 can comprise inert granular materials, for example, sand, gravel, crushed stone, etc. In some embodiments, fine aggregates can comprise aggregates that can pass through a ⅜ inch (about 9.525 mm) sieve, such that the fine aggregates may comprise a size that may be less than about 9.525 mm. In some embodiments, coarse aggregates can comprise aggregates that are larger than the fine aggregates, wherein the coarse aggregates can comprise a size that may be greater than 0.19 inch (about 4.83 mm), for example, within a range from about ⅜ inch (about 9.525 mm) to about 1.5 inches (about 38.1 mm) in cross-sectional size (e.g., diameter when the aggregates 108 comprise a circular shape). In some embodiments, the aggregate 108 comprises one or more of recycled concrete, dredging material, reclaimed material, sand, gravel, clay or crushed stone.

Depending on the desired use, the packaging of the low density lightweight particles 102 with or without some or all of the additive(s), aggregate(s), binder(s), filler(s) and admixture(s) may be done in a variety of manners. For example, in some embodiments, a dry composition is envisioned in which a pail, bucket, box, bag, sack, drum, tote, gaylord box, supersack/bulk bag, or bulk truck and/or rail car is an additive/admixture/component pack which may or may not be added to other ingredients such as may be required to make the lightweight composite composition 100. In some embodiments, a pail, bucket, box, bag, sack, drum, tote, gaylord box, supersack/bulk bag, or bulk truck and/or rail car can be pre-blended or mixed with the other ingredients as the lightweight composite composition 100.

In some embodiments, the additives and/or admixtures 104, 108 may be packaged separately in a water-soluble, dissolvable or repulpable bag. In some embodiments, the low-density lightweight particles and/or the additives and/or the admixtures, and/or the binder, and/or the fillers 102, 104, 106, 108 may be packaged together in a water-soluble, dissolvable or repulpable bag. In some embodiments, the low-density lightweight particles 102 may be used by themselves to achieve performance and results in various applications as cited above, and also, but not necessarily, incorporated into an additive/admixture that contains one or a plurality of various components previously listed. The composition and proportion of the additive/admixture itself may be formulated to uniquely overcome inherent material issues, such as non-homogeneity, separation, float-out or incompatibility. Further, the additive and/or admixture blend can provide improved resin or binder system adhesion and bonding to the particles resulting in increased strength, finish characteristics, performance characteristics, surface profile and impermeability properties of the finished system. In addition, the use of the ingredients of the additive and/or admixture system or particle coatings can advantageously enhance the low-density lightweight particles 102 to increase their strength and encapsulate secondary particle components. In some embodiments, the lightweight composite composition 100 can comprise one or more of additives and/or admixtures 104, 108 that can comprise a volume that is between about 0% to about 20% of the total volume of the lightweight composite composition 100.

In some embodiments, a non-dry (e.g., a liquid) composition is envisioned in which a pail, bucket, box, bag, sack, drum, tote, gaylord box, supersack/bulk bag, or bulk truck and/or rail car as an additive/admixture/component pack which may or may not be added to other ingredients such as may be required to make a formulated system. In some embodiments, a pail, bucket, box, bag, sack, drum, tote, gaylord box, supersack/bulk bag, or bulk truck and/or rail car can be mixed with some or all of the other ingredients required to make the lightweight composite composition 100. In some embodiments, a pail, bucket, box, bag, sack, drum, tote, gaylord box, supersack/bulk bag, or bulk truck and/or rail car can be pre-blended or mixed with the other ingredients as the lightweight composite composition 100.

By virtue of little to no porosity of the lightweight aggregates used in these systems, the associated preparation, mixing time and energy required to achieve the lightweight composite composition 100 is an advantage and enables multiple options for mixing and delivery, such as the use of ready-mix bulk trucks for job-site placement. These products can produce not just concrete systems, but also coatings, elastomers, sealants, adhesives, composites, castings, epoxy systems, and the like. The fact that these pre-mixed and pre-blended products do not require significant mixing energy and processing time are an advantage versus other systems. In some embodiments, the efficiency and ease of use resulting from incorporating these pre-mixed and pre-blended products into a ready-mix bulk truck to achieve mixing, delivery and placement is an improvement and benefit for concrete applications.

As an example of a formulated system based on this technology, below are sample concrete formulas:

| Product | Percentages By Volume |
| --- | --- |
| Sample Formula 1 | |
| Cement, Pozzolan, Binder | 5-20% |
| Fine Aggregates; 1 or more | 0-15% |
| Coarse Aggregates; 1 or more | 0-15% |
| Additives/Admixtures; 1 or more | 0-20% |
| Low Density Particles; 1 or more | 40-85% |
| Air Content | 2-18% |
| Water/Liquid/Resin/Binder | 10-30% |
| Density | 15-70 pcf |
| Compressive Strength | After the lightweight concrete composition is set for 28 days, it has a compressive strength of at least 50 to 1,500 psi as tested according to Modified ASTM C109 or Modified ASTM C39. |
| Sample Formula 2 | |
| Cement, Pozzolan, Binder | 8-20% |
| Fine Aggregates; 1 or more | 0-15% |
| Coarse Aggregates; 1 or more | 0-15% |
| Additives/Admixtures; 1 or more | 0-20% |
| Low Density Particles; 1 or more | 40-90% |
| Air Content | 2-18% |
| Water/Liquid/Resin/Binder | 10-20% |
| Density | 15-70 pcf |
| Compressive Strength | After the lightweight concrete composition is set for 28 days, it has a compressive strength of at least 250 to 2,500 psi as tested according to Modified ASTM C109 or Modified ASTM C39. |

-continued

| Product | Percentages By Volume |
|---|---|
| Sample Formula 3 | |
| Cement, Pozzolan, Binder | 8-20% |
| Fine Aggregates; 1 or more | 0-25% |
| Coarse Aggregates; 1 or more | 0-35% |
| Additives/Admixtures; 1 or more | 0-20% |
| Low Density Particles; 1 or more | 0-50% |
| Air Content | 2-18% |
| Water/Liquid/Resin/Binder | 10-25% |
| Density | 50-130 pcf |
| Compressive Strength | After the lightweight concrete composition is set for 28 days, it has a compressive strength of at least 2,000 psi as tested according to Modified ASTM C109 or Modified ASTM C39. |

According to some embodiments, methods of manufacturing the lightweight composite composition 100 can be provided. In some embodiments, methods can comprise providing the plurality of lightweight particles 102 comprising a volume of at least about 10% of a total volume of the lightweight composite composition 100. The plurality of lightweight particles 102 can comprise an average bulk density within a range from about 0.001 g/cc to about 1.5 g/cc and an average particle size within a range from about 0.01 microns to about 90 mm. In some embodiments, methods can comprise dispersing the plurality of lightweight particles 102 within the binder material 106 to form a mixture such that the plurality of lightweight particles 102 are suspended within the binder material 106. The binder material 106 can comprise a volume within a range from about 5% to about 20% of the total volume of the lightweight composite composition 100. By dispersing the plurality of lightweight particles 102, in some embodiments, the plurality of lightweight particles 102 can be mixed with the binder material 106. In some embodiments, methods can comprise setting the mixture for a period of time to form the lightweight composite composition 100 comprising a compressive strength of at least 10 pounds/in$^2$. For example, by setting the mixture, the mixture can be allowed to dry and/or harden, wherein the period of time, in some embodiments, may be about 28 days.

In some embodiments, methods can comprise applying a coating to the plurality of lightweight particles 102 prior to dispersing the plurality of lightweight particles 102 within the binder material 106. In some embodiments, methods can comprise dispersing one or more of the additive or the admixture 104, 108 within the binder material 106 such that the one or more of the additive or the admixture 104, 108 comprise a volume from between 0% to about 20% of the total volume of the lightweight composite composition 100. In some embodiments, the lightweight composite composition 100 can be used in several applications listed herein. For example, in some embodiments, after setting the mixture for the period of time, methods comprise forming one or more of a concrete block, cast shape or structure from the mixture of lightweight composite composition 100. Further, in some embodiments, after setting the mixture for the period of time, methods comprise using the lightweight composite composition in one or more of the following applications: cementing, concrete, including ready-mix, precast, tilt-up panels, ornamental, decorative, countertops, multi-family residences, commercial buildings, multi-story buildings, DIY, home improvement, roof tiles, underlayment, block, brick, mining, shotcrete, gunnite, refractory/monolithics, foundry, 3D printing, forgings and castings, cultured marble alternatives, roofing, flowable fill, void fill, underground applications, decorative, stucco, plaster, urethane and/or epoxy concrete, composites, or adhesives.

As used herein, the term "about" means that amounts, sizes, formulations, parameters, and other quantities and characteristics are not, and need not be, exact, but may be approximate and/or larger or smaller, as desired, reflecting tolerances, conversion factors, rounding off, measurement error and the like, and other factors known to those of skill in the art.

Ranges can be expressed herein as from "about" one value, and/or to "about" another value. When such a range is expressed, another embodiment includes from the one value to the other value. Similarly, when values are expressed as approximations by use of the antecedent "about," it will be understood that the value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising" and "including", and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to represent that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It should be understood that while various embodiments have been described in detail relative to certain illustrative and specific examples thereof, the present disclosure should not be considered limited to such, as numerous modifications and combinations of the disclosed features are possible without departing from the scope of the following claims.

The invention claimed is:

1. A lightweight composite composition comprising:
a plurality of lightweight particles comprising a volume of at least about 10% of a total volume of the composite composition, the plurality of lightweight particles comprising an average bulk density within a range from about 0.001 grams per cubic centimeter to about 1.5 grams per cubic centimeter and an average particle size within a range from about 0.01 microns to about 90 millimeters, further comprising a binder material in contact with the plurality of lightweight particles such that the plurality of lightweight particles are homogenously dispersed and mixed throughout the binder material, the binder material comprising a volume within a range from about 5% to about 40% of the total volume of the lightweight composite composition, the binder material comprising one or more of a cement, pozzolan, gypsum, Portland cement, calcium aluminate, or calcium sulfoaluminate;
wherein the plurality of lightweight particles comprise a non-aerogel material and a non-volcanic ash material comprising one or more of acrylic, acrylonitrile based copolymer, graphene, a ceramic material, an alumina material, synthetic glass microspheres, polymer microspheres, ceramic microspheres, foamed rubber, crumb rubber, an EPDM material, polyamide, polyolefin, polystyrene, polyvinyl chloride, PET, PMMA, PMU, melamine, urea formaldehyde, ABS, LDPE, HDPE, or PVDC, wherein the lightweight composite composition comprises a compressive strength of at least 10 pounds/in$^2$, and a bulk density within a range from about 15 pounds per cubic foot to about 135 pounds per cubic foot.

2. The lightweight composite composition of claim 1, wherein the average bulk density of the plurality of lightweight particles is within a range from about 0.005 grams per cubic centimeter to about 0.4 grams per cubic centimeter.

3. The lightweight composite composition of claim 1, wherein the plurality of lightweight particles are one or more of treated or modified with one or more of a liquid, a gel, or a powder.

4. The lightweight composite composition of claim 1, wherein the plurality of lightweight particles comprise a specific gravity within a range from about 0.005 grams per cubic centimeter to about 0.9 grams per cubic centimeter.

5. The lightweight composite composition of claim 1, further comprising one or more additives or admixtures comprising one or more of acrylic fiber, carbon fiber, graphene, basaltic fiber, glass fiber, soda lime glass, calcium carbonate, silicates, clay, alumina, calcium stearate, magnesium stearate, zinc stearate, coloring agents, corrosion inhibitors, shrinkage reducers, fly ash, foaming agents and or defoamers, air entrainers, fire retardants, fungicide, mildewcide, biocide, rodenticide, insecticide, high-range water reducer, mid-range water reducer, plasticizer, polycarboxylate, wood pulp, metakaolin, polymer resin additive, vinyl acetate and ethylene based redispersible powders, set retarding and or accelerating admixtures, strength enhancing admixtures, silanes, siloxane, surfactants, coupling agents, silica fume, micro-silica, slag, calcium hydroxide, calcium sulfate, wollastonite, thixotropes and or rheology modifiers, cellulosics, fumed silicas, zinc borate or boric acid, chlorinated paraffin, antimony oxide, alumina trihydrate, or magnesium hydroxide.

6. The lightweight composite composition of claim 5, wherein the additives or the admixtures comprises a volume that is within a range up to about 30% of a total volume of the lightweight composite composition.

7. The lightweight composite composition of claim 5, wherein the plurality of lightweight particles are one or more of treated or modified with one or more of a liquid, a gel, or a powder.

8. The lightweight composite composition of claim 5, wherein an R-value of the lightweight composite composition is within a range from about 0 to about 5 per inch.

9. The lightweight composite composition of claim 5, wherein the compressive strength is within one of the following ranges:
a range from about 50 pounds/in$^2$ to about 1,500 pounds/in$^2$;
a range from about 250 pounds/in$^2$ to about 2,500 pounds/in$^2$; or
greater than about 2,000 pounds/in$^2$.

10. The lightweight composite composition of claim 5, wherein the plurality of lightweight particles comprise one or more of the following shapes: a rounded shape, a sub-round shape, an angular shape, a sub-angular shape, a cylindrical shape, a pancake shape, an oblong shape, a polygonal shape, a disc shape, a lamellar shape, a regular crystalline shape, or an irregular crystalline shape.

11. The lightweight composite composition of claim 1, wherein the plurality of lightweight particles comprise the non-aerogel material and the non-volcanic ash material and comprise one or more of acrylic, acrylonitrile based copolymer, graphene, a ceramic material, an alumina material, foamed rubber, crumb rubber, an EPDM material, polyamide, polyolefin, polystyrene, polyvinyl chloride, PET, PMMA, PMU, melamine, urea formaldehyde, ABS, LDPE, HDPE, or PVDC.

12. A lightweight composite composition comprising:
a plurality of lightweight particles comprising a volume of at least about 10% of a total volume of the lightweight composite composition, the plurality of lightweight particles comprising an average bulk density within a range from about 0.001 grams per cubic centimeter to about 1.5 grams per cubic centimeter and an average particle size within a range from about 0.01 microns to about 90 millimeters, wherein the plurality of lightweight particles comprise a non-volcanic ash material comprising one or more of acrylic, acrylonitrile based copolymer, graphene, a ceramic material, an alumina material, synthetic glass microspheres, polymer microspheres, ceramic microspheres, foamed rubber, crumb rubber, an EPDM material, polyamide, polyolefin, polystyrene, polyvinyl chloride, PMMA, PMU, melamine, urea formaldehyde, ABS, LDPE, HDPE or PVDC;
one or more of an additive or an admixture comprising a volume up to about 20% of the total volume of the lightweight composite composition, the additive or admixture comprising one or more of acrylic fiber, carbon fiber, graphene, basaltic fiber, glass fiber, soda lime glass, calcium carbonate, silicates, clay, alumina, calcium stearate, magnesium stearate, zinc stearate, coloring agents, corrosion inhibitors, shrinkage reducers, fly ash, foaming agents and or defoamers, air entrainers, fire retardants, fungicide, mildewcide, biocide, rodenticide, insecticide, high-range water reducer, mid-range water reducer, plasticizer, polycarboxylate, wood pulp, metakaolin, polymer resin additive, vinyl acetate and ethylene based redispersible powders, set retarding and or accelerating admixtures, strength enhancing admixtures, silanes, siloxane, surfactants, coupling agents, silica fume, micro-silica, slag, calcium hydroxide, calcium sulfate, wollastonite, thixotropes and or rheology modifiers, cellulosics, fumed silicas, zinc borate or boric acid, chlorinated paraffin, antimony oxide, alumina trihydrate, or magnesium hydroxide; and
a binder material in contact with the plurality of lightweight particles, and the one or more of the additive or the admixture such that the plurality of lightweight particles, and the one or more of the additive or the admixture are dispersed within the binder material and wherein the plurality of lightweight particles are in contact with the binder material such that the plurality of lightweight particles are homogenously dispersed and mixed throughout the binder material, the binder material comprising a volume within a range from about 5% to about 40% of the total volume of the lightweight composite composition, the binder material comprising one or more of a cement, pozzolan, gypsum, Portland cement, calcium aluminate, or calcium sulfoaluminate, wherein the lightweight composite composition comprises a compressive strength of at least 10 pounds/in$^2$, and a bulk density within a range from about 15 pounds per cubic foot to about 135 pounds per cubic foot.

13. The lightweight composite composition of claim 12, wherein the plurality of lightweight particles are one or more of coated, treated, or modified with one or more of a liquid, a gel, or a powder.

14. The lightweight composite composition of claim 12, further comprising an aggregate up to about 60% of the total volume of the lightweight composite composition, wherein the aggregate comprises one or more of recycled concrete, reclaimed material, sand, gravel, clay or crushed stone.

15. A lightweight composite composition comprising:
a plurality of lightweight particles comprising a volume of at least about 10% of a total volume of the composite composition, the plurality of lightweight particles comprising an average bulk density within a range from about 0.001 grams per cubic centimeter to about 1.5 grams per cubic centimeter and an average particle size within a range from about 0.01 microns to about 90 millimeters, further comprising a binder material in contact with the plurality of lightweight particles, the binder material comprising a volume within a range from about 5% to about 40% of the total volume of the lightweight composite composition, the binder material comprising one or more of a cement, pozzolan, gypsum, Portland cement, calcium aluminate, or calcium sulfoaluminate, wherein the plurality of lightweight particles comprise a non-volcanic ash material comprising one or more of polymer pellets, polymer foam beads, crushed glass, foamed glass spheres, hollow glass microspheres, polymer microspheres, polymer capsules, polymer micro-balloons, or carbon-based pellets; and
an aggregate up to about 60% of the total volume of the lightweight composite composition, the aggregate comprising one or more of recycled concrete, reclaimed material, sand, gravel, clay or crushed stone, wherein the plurality of lightweight particles and the aggregate are homogenously dispersed and mixed throughout the binder material, wherein the lightweight composite composition comprises a compressive strength of at least 10 pounds/in$^2$, and a bulk density within a range from about 15 pounds per cubic foot to about 135 pounds per cubic foot.

16. The lightweight composite composition of claim 15, wherein the compressive strength is within one or more of the following ranges:
a range from about 50 pounds/in$^2$ to about 1,500 pounds/in$^2$;
a range from about 250 pounds/in$^2$ to about 2,500 pounds/in$^2$; or
greater than about 2,000 pounds/in$^2$.

* * * * *